United States Patent
Ning

(10) Patent No.: US 10,261,290 B2
(45) Date of Patent: Apr. 16, 2019

(54) COMPACT WIDE ANGLE LENS

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 0 days.

(21) Appl. No.: 15/390,365

(22) Filed: Dec. 23, 2016

(65) Prior Publication Data

US 2017/0184814 A1    Jun. 29, 2017

Related U.S. Application Data

(60) Provisional application No. 62/271,321, filed on Dec. 28, 2015.

(51) Int. Cl.
| | |
|---|---|
| *G02B 13/18* | (2006.01) |
| *G02B 3/02* | (2006.01) |
| *G02B 13/00* | (2006.01) |
| *G02B 9/64* | (2006.01) |
| *G02B 13/06* | (2006.01) |

(52) U.S. Cl.
CPC ............ *G02B 13/006* (2013.01); *G02B 9/64* (2013.01); *G02B 13/0045* (2013.01); *G02B 13/06* (2013.01)

(58) Field of Classification Search
CPC ..... G02B 13/006; G02B 9/64; G02B 13/0045
See application file for complete search history.

(56) References Cited

U.S. PATENT DOCUMENTS

| | | | |
|---|---|---|---|
| 4,329,024 A | 5/1982 | Rogers | |
| 4,537,476 A | 8/1985 | Nanjo | |
| 5,861,999 A | 1/1999 | Tada | |
| 5,870,234 A | 2/1999 | Ebbesmeier | |
| 5,999,332 A | 12/1999 | Ohno | |
| 7,023,628 B1 | 4/2006 | Ning | |
| 7,175,287 B2 | 2/2007 | Gohman | |
| 7,215,482 B2 * | 5/2007 | Matsusaka | G02B 13/0035 348/240.3 |
| 7,826,151 B2 | 11/2010 | Tsai | |
| 7,864,452 B2 | 1/2011 | Ning | |
| 7,929,221 B2 | 4/2011 | Ning | |
| 8,169,717 B2 | 5/2012 | Caldwell | |
| 8,254,040 B2 | 8/2012 | Peng et al. | |
| 8,264,783 B2 | 9/2012 | Peng et al. | |
| 8,270,097 B2 | 9/2012 | Yamakawa | |
| 8,379,326 B2 | 2/2013 | Yamakawa | |
| 8,416,510 B2 | 4/2013 | Kubota et al. | |
| 8,416,512 B2 | 4/2013 | Harada et al. | |
| 2012/0026285 A1 | 2/2012 | Yoshida et al. | |

(Continued)

*Primary Examiner* — Alicia M Harrington
(74) *Attorney, Agent, or Firm* — Mark Wisnosky

(57) ABSTRACT

Compact wide angle lens designs are described. The lens has three lens groups and includes complex aspherical lens elements. The lens designs have a field of view of 80° or greater and satisfies at least one of the conditional equations
a) BFL/EFL<=0.6 where BFL is the distance from the image surface vertex of the complex aspheric lens element to the image plane, EFL is the effective focal length of the optical lens, and,
b) BFL/CA<=0.3 where CA is the clear aperture of the complex aspheric lens element, EFL is the effective focal length of the optical lens, and,
c) 3=<TTL/EFL<=6.6 where TTL is the distance from the vertex of the first element of group 1 to the image plane of the lens assembly when focused at infinity, EFL is the effective focal length of the optical lens.

5 Claims, 5 Drawing Sheets

(56) References Cited

U.S. PATENT DOCUMENTS

2013/0128369 A1     5/2013  Kim
2014/0247509 A1     9/2014  Tsai
2014/0354858 A1*   12/2014  Kawamura .......... G02B 15/177
                                                      348/240.3
2015/0177485 A1     6/2015  Hsu et al.

* cited by examiner

COMPACT WIDE ANGLE LENS

CROSS-REFERENCE TO RELATED APPLICATIONS

This application claims priority to U.S. Provisional Application 62/271,321, titled Compact wide angle lens, filed Dec. 28, 2015, by the same inventor and currently pending.

STATEMENT REGARDING FEDERALLY SPONSORED RESEARCH OR DEVELOPMENT

Not Applicable.

BACKGROUND OF THE INVENTION

Technical Field

The invention relates to wide-angle lenses, having high quality images across the entire field of view in a compact form factor.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. The lenses are increasing being incorporated into a variety of electronic devices including mobile phones, cameras, sports cameras, computers and computer peripherals. Incorporation of the lenses into new devices also places new environmental performance requirements upon the lens. The lens must be compact and light, to be used in portable devices, and must maintain high performance characteristics.

The quality and pixel density of very small imaging sensors is continuously improving. The sensors are used in machine vision, medical, cell phone and automotive applications. In many cases low distortion is critical to proper functioning in the intended application. These lenses are being used more and more in consumer application where literally millions of such lens systems must be easily produced at consistent high quality and at low cost. Custom lens features required to produce low distortion must be designed such that they are also easy to manufacture.

Lateral chromatic aberration is the separation of image height on the focal plane at off-axis field points between light rays of different wavelengths. This aberration becomes more significant and difficult to correct for wide-angle lenses. Similarly optical distortion is separation of image features on the focal plane at off-axis field points resulting in distortion of shapes and inconsistency of image feature detail location across the image plane.

Both types distortion cannot be fully corrected through mathematical manipulation of the digital images, in order for such corrections to be effective requires that the lens designer produces a well behaved lens. Optical distortion aka fisheye distortion is a departure from f-tan condition (where the image height is equal to the product of the effective focal length and tangent of the field angle). A distortion free lens would follow the f-tan relationship perfectly. Optical distortion is more difficult with wide angle lens that are designed to be compact.

There is a need for new lens designs that exhibit low color aberration and low optical distortion that follow the f-tan relationship and the lens is a compact lens.

There is a need for new lens designs that exhibit low color aberration and low optical distortion that follow the f-tan relationship, especially for wide-angle (field of view greater than 80o) and super wide-angle lens designs (field of view greater than 170o).

There is also need to provide super wide-angle and fisheye lens designs that can be manufactured cheaply, consistently and can be automatically assembled.

BRIEF SUMMARY OF THE INVENTION

The present invention comprises 3 lens groups counting from the object side: Group 1, Group 2 and Group 3. The Groups are each described as: Group 1: This is the first lens group facing the object space. This group comprises at least 2 lens elements wherein the first element has a negative power. In the first preferred embodiment, at least one of the two elements is a positive lens element. In the second preferred embodiment, an aspheric element is included in this group. An aspheric element defined as lens element having at least one aspheric surface, which is generally described by the following well-known equation:

$$z = \frac{cr^2}{1 + \sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}. \tag{1}$$

Where z is the sag height measured from the vertex at radial distance of r. C is the curvature of the surface. K is the conic constant and the alphas are the aspheric coefficients. The first element (L1) is a meniscus element with a convex surface facing the object.

Group 2: This group has positive power comprising at least 3 lens elements including a cemented doublet formed by two of the 3 elements, and an aperture stop. In preferred embodiment the first and the second elements have positive power. The third element has negative power having a double concave shape. The 2nd and 3rd elements form a cemented doublet. An aperture is located adjacent to this group. In some embodiments, an aperture stop is located between the 1st and 2nd element.

Group 3: This lens group comprises at least 2 elements. At least one of them is an aspherical element. In preferred embodiment this aspheric element is the last element that faces the image space. One surface of the aspheric element has a complex surface profile. The definition of a complex aspheric surface is that the local surface derivative of the surface profile changes sign at least once going from center to the edge of the lens element. In preferred embodiment the complex aspheric surface is the last optically powered surface facing the image plane (not including any flat filter or sensor cover glass). The distance from the image side surface vertex of the last lens element to the image plane is back focal length (BFL). The overall effective focal length of the lens assembly is EFL. The clear aperture diameter of this complex aspheric surface is CA. TTL is the distance from the vertex of the first element of group 1 to the image plane of the lens assembly when focused at infinity. At least one of the following conditions are satisfied:

$$BFL/EFL \leq 0.6 \tag{2}$$

$$BFL/CA \leq 0.3 \tag{3}$$

$$3 \leq TTL/EFL \leq 6.6 \tag{4}$$

In the preferred embodiment all three conditional equations 2-4 are satisfied. All of the lenses have a field of view of 80° or greater. The specific examples are not intended to limit the inventive concept to the example application. Other aspects and advantages of the invention will be apparent from the accompanying drawings and detailed description.

DETAILED DESCRIPTION OF THE INVENTION

The radius of curvature in all examples is measured at the point on the lens intersecting the optical axis of the wide-angle lens. The description of the lens elements as flat, convex or concave refers to the curvature at this point on the lens surface that intersects the optical axis. A lens surface may also be aspherical thus a lens element surface that is described as flat and aspherical implies it is flat at the point on the lens surface that intersects the optical axis but curved elsewhere. The term lens or wide-angle lens refers to the wide-angle lens that is comprised of a plurality of lens elements. Each lens element by itself is also known in the literature as a lens. Here, lens refers to the multi-component system.

Figure 1:
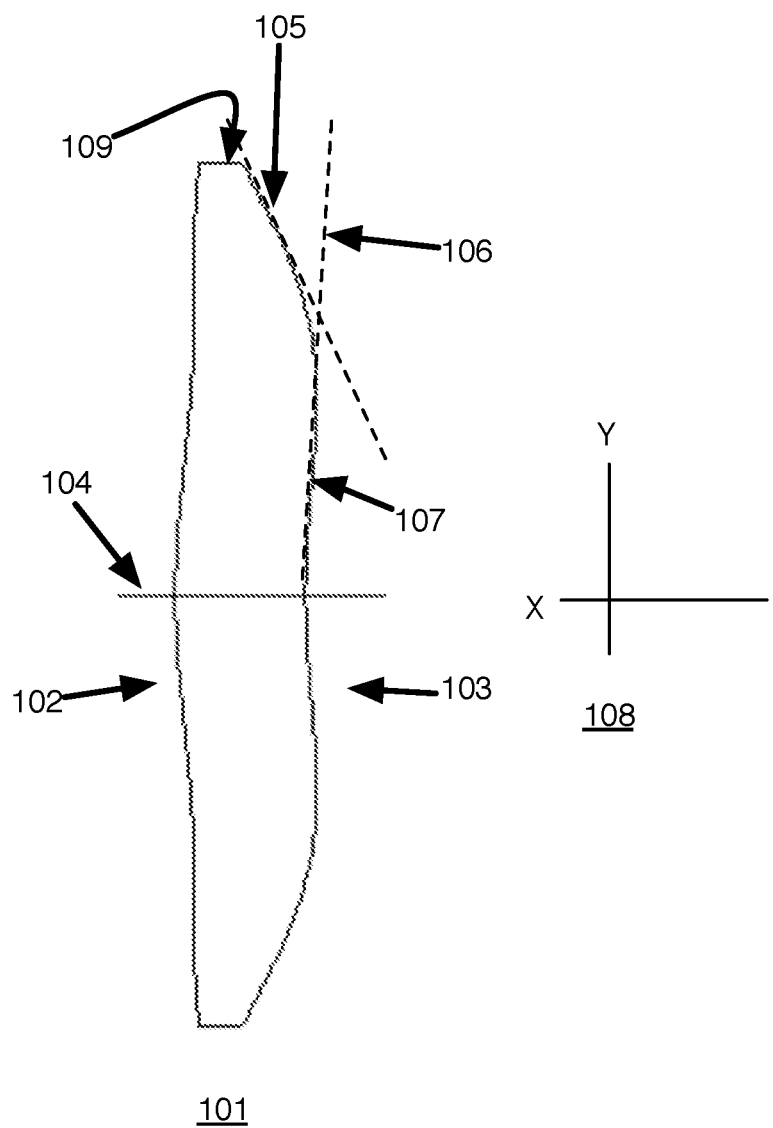
FIG. 1 is a diagram of a complex aspheric lens element.

Referring to FIG. 1 a complex aspheric surface on a lens element is shown. The lens element 101 is shown in a cross-sectional profile, as are all of the subsequent lens designs. The lens element 101 is centered on the optical axis 104. The lens is oriented such that the object side 102 is to the left and the image side 103 is to the right the surface 107 is a complex aspherical surface in that it is non-spherical and the slope of tangents 105, 106 have opposite signs. A complex aspherical surface is one in which the local derivative of the surface profile changes sign at least once going from center or optical axis 104 to the edge 109 of the lens element. That is dy/dx is positive for tangent line 106 and negative for tangent line 105. The example shows a single sign change for the surface derivative. Other embodiments may have more than one sign change.

Figure 2:
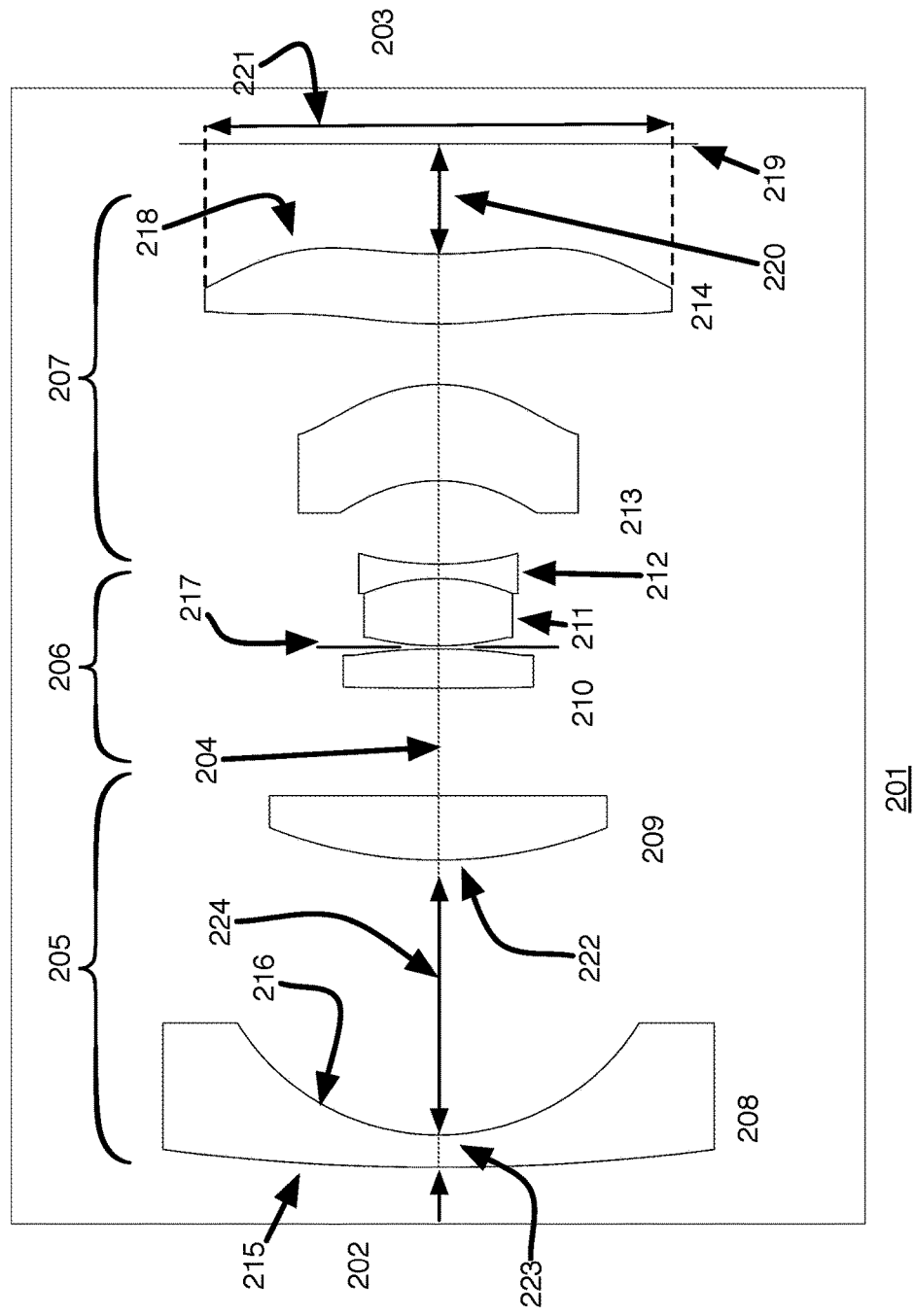
FIG. 2 is a diagram of a first embodiment of the compact wide angle lens.

FIG. 2 shows a first embodiment of the invented compact wide angle lens. The Figure is used both to show the general features of the invented wide angle lens as well as a specific example. The lens 201, in going from object 202 to image 203, is comprised of three (3) lens groups 205, 206, 207. The first lens group 205 has negative power and is comprised of at least 2 lens elements 208, 209. In the first preferred embodiment, at least one of the two elements 209 is a positive lens element. In other preferred embodiments shown in later Figures, an aspheric element is included in this first group 205.

The second lens group 206 has positive power comprising at least 3 lens elements 210, 211, 212 including a cemented doublet formed by two of the 3 elements 211, 212, and an aperture stop 217. In preferred embodiment the first 210 and the second 211 elements have positive power. The third element 212 has negative power having a double concave shape. The 2nd and 3rd elements 211, 212 form a cemented doublet. An aperture stop 217 is located between the first 210 and second 211 element.

The third lens group 207 comprises at least 2 elements 213, 214. At least one of them is an aspherical element. In preferred embodiment an aspheric element 214 is the last element that faces the image plane 219. One surface 218 of the aspheric element has a complex surface profile. In a preferred embodiment the complex aspheric surface 218 is the last optically powered surface facing the image plane 219 (not including any flat filter or sensor cover glass). The distance 220 from the image side surface 218 vertex of the last lens element 214 to the image plane 219 is back focal length (BFL). The overall effective focal length of the lens assembly is EFL. The clear aperture diameter 221 of this complex aspheric surface 218 is CA. The lens elements are selected and placed to satisfy the equations 2 and 3 shown above.

Each of the lens examples include a specification for each lens element. The specification includes material properties such as index of refraction and Abbe number as well as dimensions, formulas for each surface curvature, thickness of the lens elements and spacing between lens elements The radius of curvature for each lens element is measured at the intersection of each surface with the optical axis 204 of the wide-angle lens. Surfaces are numbered consecutively from object to image. Thus surface 1 is the first surface 215 of the first lens element 208. Surface is the second or image side surface 216 of the same lens element. Surface 3 is the first, object side, surface 223 off the second lens element 209 and so forth through all elements of the lens 201. Thickness is defined as the distance from the surface to the next labeled surface measured along the optical axis 204. For example, in the Table 1A the thickness 223 of the lens element 208, the distance between the first surface 215 and the second surface 216 of that lens element, is 1.00 mm. The distance 224 from the image side surface 216 to third surface 222 is 8.515 mm.

Index in Table 1A is the index of refraction, and, Abbe # is the Abbe Number for the lens element corresponding to the designated surface at 578 nm (d-line). For example, the index of refraction of the first lens element 208 is 1.618 and the Abbe Number of the first element 208 is 63.417. The values for Radius and Thickness values are all given in mm. The values may be scaled by the effective focal length and the design may therefore be scaled for a lens of any focal length.

Four specific examples satisfying the description of the invented wide angle lens follow. Each of the examples represent a wide angle lens with a field of view of 90° or greater, comprised of three lens groups as described above, satisfy equation 2 and 3, and include a complex aspheric surface as the last lens element surface prior to the image plane.

Example 1

FIG. 2 shows the layout of Example 1. This design has a field angle of +/−47°, for a total field of view 94°, with a relative aperture of F/2.8. The lens is comprised, from object to image, of three lens groups. Group 1, 205 comprises two lens elements 208, 209. Group 2, 206 comprises three lens elements 210, 211, 212 with an aperture stop between the first 210 and second 211 element of the group and the second and third elements 211, 212 of the group are a cemented doublet. Group 3 comprises two lens elements 213, 214 and are aspheric elements. All four surfaces of these two lens elements 213, 214 are aspheric The image space facing side 218 the last lens element 214 is a complex aspheric surface. Table 1A shows the optical specification for this first example. The surfaces are numbered as already described. The radiuses of curvature are measured at the optical axis 204. Table 1B shows the optical specifications for the aspheric lens by providing the constants for Equation 1. The conic constant for all surfaces in this example is 0. The EFL of this example 1 is 8.28 mm. BFL is 3.41 mm and the CA of 14.42 mm. The conditional expression (2) and (3) are satisfied.

TABLE 1A

The optical prescription of Example 1.

| Surface | Type | Radius | Thickness | Nd | Abbe# | Diameter |
|---|---|---|---|---|---|---|
| 1 | STD. | 66.377 | 1.000 | 1.618 | 63.417 | 17.035 |
| 2 | STD. | 7.286 | 8.515 | | | 12.403 |
| 3 | STD. | 14.003 | 1.991 | 1.911 | 35.256 | 10.429 |
| 4 | STD. | Infinity | 3.341 | | | 9.892 |
| 5 | STD. | 127.726 | 1.214 | 1.618 | 63.417 | 5.881 |
| 6 | STD. | −17.653 | 0.100 | | | 5.206 |
| STO | STD. | 8.998 | 2.080 | 1.729 | 54.669 | 4.282 |
| 8 | STD. | −5.867 | 0.442 | 1.728 | 28.315 | 4.612 |
| 9 | STD. | 9.228 | 2.582 | | | 4.916 |
| 10 | ASPH. | −4.957 | 2.994 | 1.535 | 56.197 | 6.114 |
| 11 | ASPH. | −5.065 | 1.865 | | | 8.655 |
| 12 | ASPH. | 12.975 | 2.167 | 1.633 | 23.327 | 13.997 |
| 13 | ASPH. | 14.115 | 3.407 | | | 14.420 |
| IMA | STD. | Infinity | | | | 16.028 |

STD. = SPHERICAL LENS SURFACE,
ASPH. = ASPHERIC LENS SURFACE

TABLE 1B

The aspheric coefficients for the aspheric surfaces of Example 1 as per Equation (1).

| Surface Number | Coefficients |
|---|---|
| Surface 10: | |
| Coeff on r 2: | 0 |
| Coeff on r 4: | −0.00083533472 |
| Coeff on r 6: | 9.7714702e−005 |
| Coeff on r 8: | 6.5201738e−006 |
| Surface 11: | |
| Coeff on r 2: | 0 |
| Coeff on r 4: | 0.00022411518 |
| Coeff on r 6: | 4.7708268e−005 |
| Coeff on r 8: | 3.8503953e−006 |
| Surface 12: | |
| Coeff on r 2: | 0 |
| Coeff on r 4: | −0.0017036826 |
| Coeff on r 6: | 2.7989386e−005 |
| Coeff on r 8: | −1.5069974e−007 |

TABLE 1B-continued

The aspheric coefficients for the aspheric surfaces of Example 1 as per Equation (1).

| Surface Number | Coefficients |
|---|---|
| Surface 13: | |
| Coeff on r 2: | 0 |
| Coeff on r 4: | −0.0018493911 |
| Coeff on r 6: | 6.8877976e−006 |
| Coeff on r 8: | 2.4459406e−007 |
| Coeff on r 10: | −2.1121465e−009 |

Example 2

Figure 3:
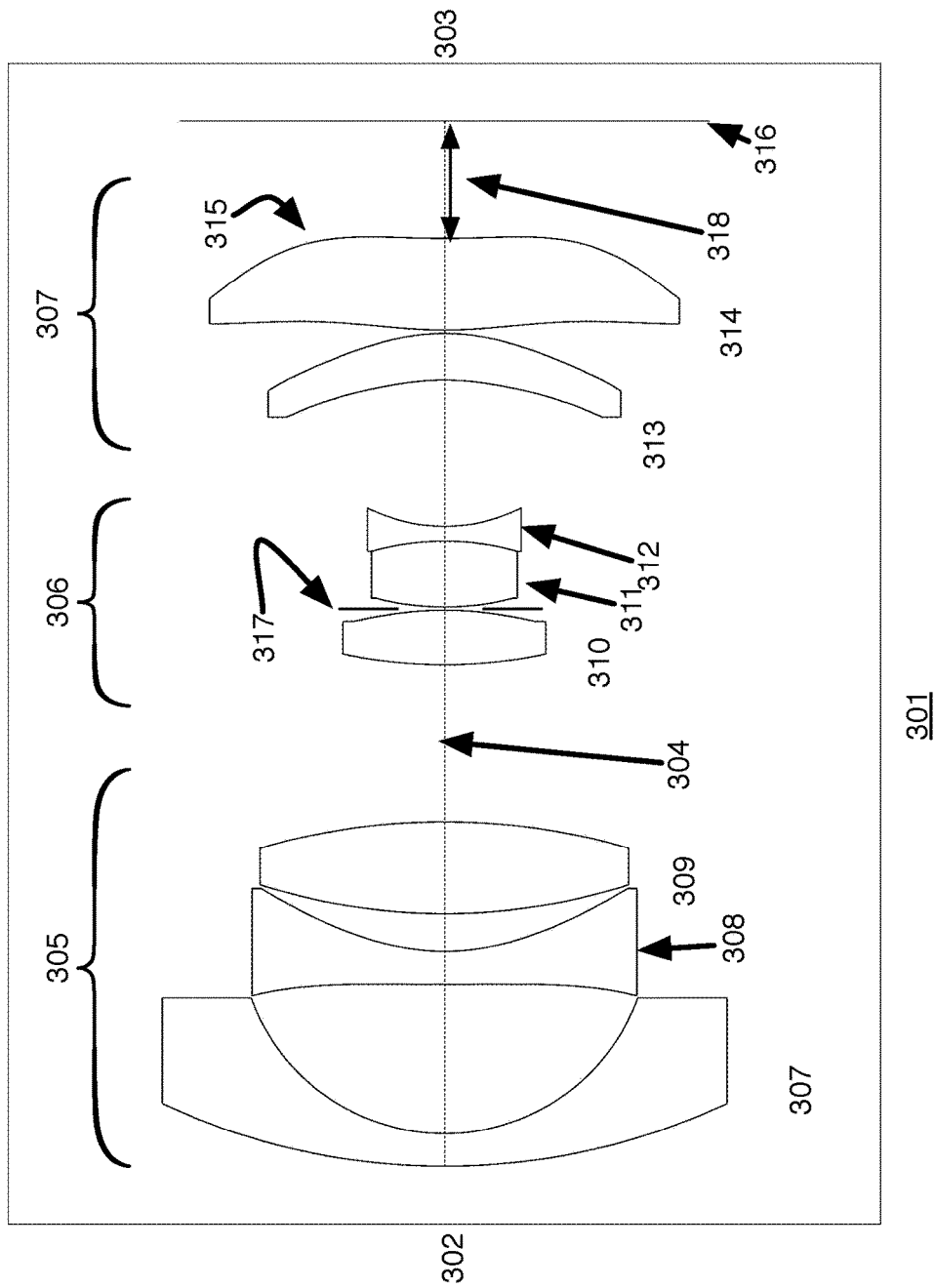
FIG. 3 is a diagram of a second embodiment of the compact wide angle lens.

FIG. 3 shows the layout of Example 2. This design has a field angle of +/−50° (for a total field of view 100°) with a relative aperture of F/2.8. The lens 301, in going from object 302 to image 303, is comprised of three (3) lens groups 305, 306, 307. The first lens group 305 has negative power and is comprised of at least 2 lens elements and in this example is comprised of three lens elements 307, 308, 309. At least one of the elements 309 is a positive lens element. An aspheric element 308 is included in this first group 305.

The second lens group 306 has positive power comprising at least 3 lens elements 310, 311, 312 including a cemented doublet formed by two of the 3 elements 311, 312, and an aperture stop 317. The first 310 and the second 311 elements have positive power. The third element 312 has negative power having a double concave shape. The 2nd and 3rd elements 311, 312 form a cemented doublet. An aperture stop 317 is located between the first 310 and second 311 element of the second lens group 306.

The third lens group 307 comprises at least 2 elements 313, 314. At least one of them is an aspherical element. In this case, both lens elements 313, 314 of the third group 307 are aspheric. An aspheric element 314 is the last element that faces the image plane 316. One surface 315 of the aspheric element 314 has a complex surface profile. The complex aspheric surface 315 is the last optically powered surface facing the image plane 316 (not including any flat filter or sensor cover glass). The distance 318 from the image side surface 315 vertex of the last lens element 314 to the image plane 316 is back focal length (BFL). The overall effective focal length of the lens assembly is EFL. The clear aperture diameter of this complex aspheric surface is CA. The lens elements are selected and placed to satisfy the equations 2 and 3 shown above. Table 2A shows the optical specification for this second example. The surfaces are numbered as already described. The radiuses of curvature are measured at the optical axis 304. Table 2B shows the optical specifications for the aspheric lens by providing the constants for Equation 1. The EFL of this example is 7.45 mm. BFL is 3.55 mm and the CA of 14.2 mm. The conditional expression (2) and (3) are satisfied.

TABLE 2A

Optical prescription of Example 2.

| Surf | Type | Radius | Thickness | Nd | Abbe# | Diameter | Conic |
|---|---|---|---|---|---|---|---|
| 1 | STD | 20.000 | 1.000 | 1.623 | 56.952 | 17.084 | 0.000 |
| 2 | STD | 6.204 | 4.524 | | | 11.680 | 0.000 |
| 3 | ASPH. | 110.703 | 1.000 | 1.535 | 56.197 | 11.639 | 0.000 |
| 4 | STD. | 6.942 | 1.141 | | | 11.099 | −2.189 |
| 5 | STD. | 18.150 | 2.793 | 1.911 | 35.256 | 11.149 | 0.000 |
| 6 | STD. | −19.740 | 4.754 | | | 11.045 | 0.000 |
| 7 | STD. | 14.485 | 1.650 | 1.535 | 56.197 | 6.142 | 0.000 |
| 8 | ASPH. | −10.748 | 0.100 | | | 5.470 | 0.000 |

TABLE 2A-continued

Optical prescription of Example 2.

| Surf | Type | Radius | Thickness | Nd | Abbe# | Diameter | Conic |
|---|---|---|---|---|---|---|---|
| STO | STD. | 8.203 | 2.010 | 1.729 | 54.669 | 4.148 | 0.000 |
| 10 | STD. | −8.203 | 0.450 | 1.728 | 28.315 | 4.416 | 0.000 |
| 11 | STD. | 5.107 | 4.424 | | | 4.659 | 0.000 |
| 12 | ASPH. | −7.986 | 1.420 | 1.535 | 56.197 | 9.530 | 0.000 |
| 13 | ASPH. | −6.185 | 0.100 | | | 10.660 | 0.000 |
| 14 | ASPH. | 14.314 | 2.792 | 1.640 | 23.522 | 13.611 | 0.000 |
| 15 | ASPH. | 27.202 | 3.549 | | | 14.202 | 0.000 |
| IMA | STD. | Infinity | | | | 16.019 | 0.000 |

TABLE 2B

The aspheric coefficients for the aspheric surfaces of Example 2 as per Equation (1).

Surface 3:

| | |
|---|---|
| Coeff on r 2: | 0 |
| Coeff on r 4: | −0.00061525091 |
| Coeff on r 6: | 8.1948189e−006 |
| Coeff on r 8: | −8.3082433e−008 |

Surface 8:

| | |
|---|---|
| Coeff on r 2: | 0 |
| Coeff on r 4: | 0.0002179492 |
| Coeff on r 6: | −1.4912038e−006 |

Surface 12:

| | |
|---|---|
| Coeff on r 2: | 0 |
| Coeff on r 4: | 0.0022010651 |
| Coeff on r 6: | −9.4364766e−005 |

Surface 13:

| | |
|---|---|
| Coeff on r 2: | 0 |
| Coeff on r 4: | 0.0017457744 |
| Coeff on r 6: | −1.2657953e−005 |
| Coeff on r 8: | 2.8577692e−007 |

Surface 14:

| | |
|---|---|
| Coeff on r 2: | 0 |
| Coeff on r 4: | −0.0016285282 |
| Coeff on r 6: | 2.8354991e−005 |
| Coeff on r 8: | −2.0180218e−007 |
| Coeff on r 10: | 3.2670732e−010 |

Surface 15:

| | |
|---|---|
| Coeff on r 2: | 0 |
| Coeff on r 4: | −0.00197103 |
| Coeff on r 6: | 2.4326944e−005 |
| Coeff on r 8: | −2.2165103e−007 |
| Coeff on r 10: | 1.661843e−009 |

Example 3

Figure 4:
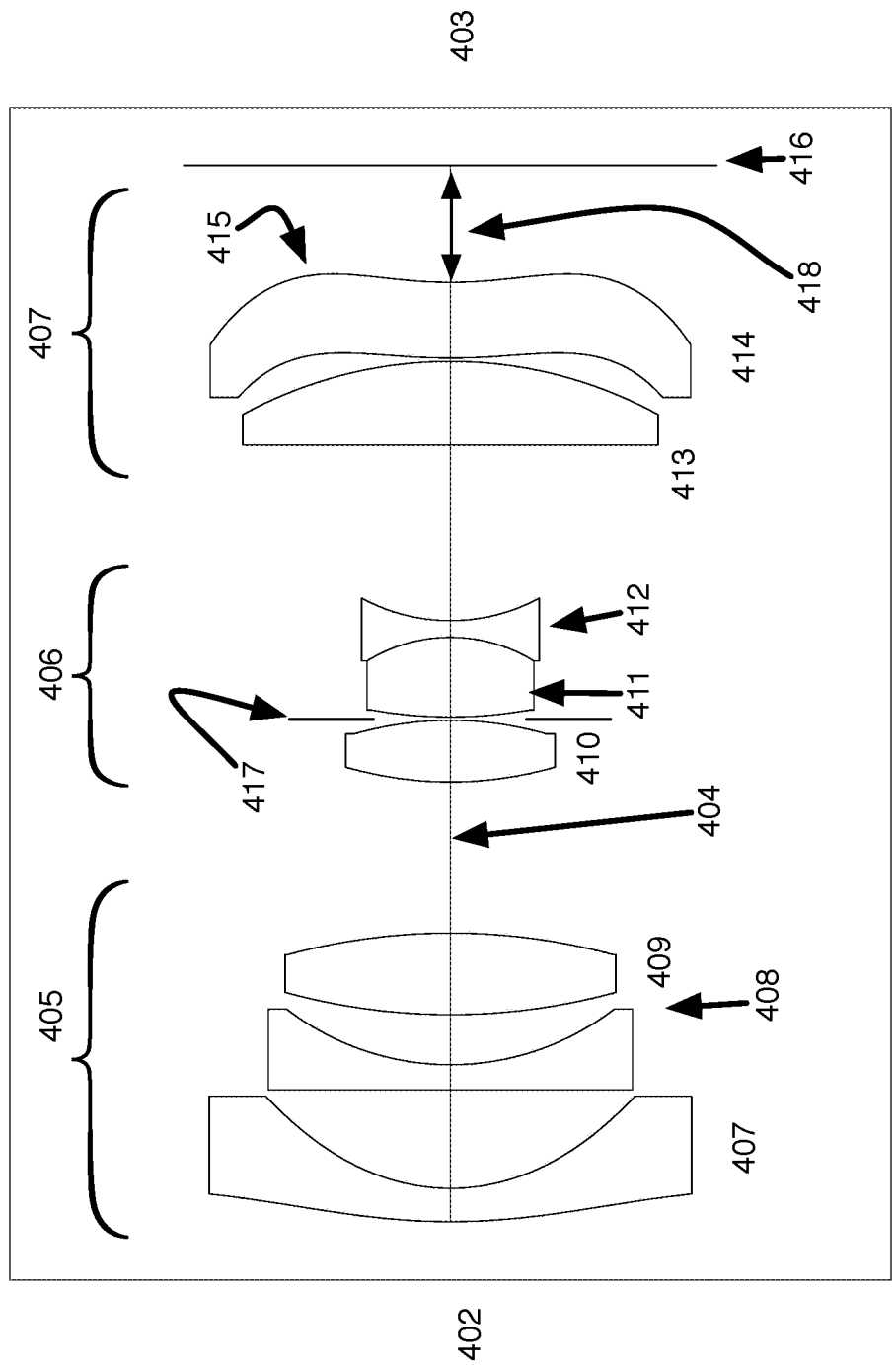
FIG. 4 is a diagram of a third embodiment of the compact wide angle lens.

FIG. 4 shows the layout of Example 3. This design has a field angle of +/−45° (for a total field of view 90°) with a relative aperture of F/2.9. The lens 401, in going from object 402 to image 403, is comprised of three (3) lens groups 405, 406, 407. The first lens group 405 has negative power and is comprised of at least 2 lens elements and in this example is comprised of three lens elements 407, 408, 409. At least one of the elements 409 is a positive lens element. An aspheric element 407 is included in this first group 405.

The second lens group 406 has positive power comprising at least 3 lens elements 410, 411, 412 including a cemented doublet formed by two of the 3 elements 411, 412, and an aperture stop 417. The first 410 and the second 411 elements have positive power. The third element 412 has negative power having a double concave shape. The 2nd and 3rd elements 411, 412 form a cemented doublet. An aperture stop 417 is located between the first 410 and second 411 element of the second lens group 406.

The third lens group 407 comprises at least 2 elements 413, 414. At least one of them 414 is an aspherical element. An aspheric element 414 is the last element that faces the image plane 416. At least one surface 415 of the aspheric element 414 has a complex surface profile. A complex aspheric surface 415 is the last optically powered surface facing the image plane 416 (not including any flat filter or sensor cover glass). In this example 3, both surfaces of the lens element 415 are complex aspheric surfaces. The distance 418 from the image side surface 415 vertex of the last lens element 414 to the image plane 416 is back focal length (BFL). The overall effective focal length of the lens assembly is EFL. The clear aperture diameter of this complex aspheric surface is CA. The lens elements are selected and placed to satisfy the equations 2 and 3 shown above. Table 3A shows the optical specification for this third example. The surfaces are numbered as already described. The radiuses of curvature are measured at the optical axis 404. Table 3B shows the optical specifications for the aspheric lens by providing the constants for Equation 1. The EFL of this example is 8.88 mm. BFL is 3.51 mm and the CA of 14.4 mm. The conditional expression (2) and (3) are satisfied. Table 3A shows the optical specification for this second example. The surfaces are numbered as already described. The radiuses of curvature are measured at the optical axis 404. Table 3B shows the optical specifications for the aspheric lens by providing the constants for Equation 1. The EFL of this example is 8.88 mm. BFL is 3.51 mm and the CA of 14.4 mm. The conditional expression (2) and (3) are satisfied.

TABLE 3A shows the optical prescription of Example 3.

| Surf | Type | Radius | Thickness | Nd | Abbe# | Diameter | Conic |
|---|---|---|---|---|---|---|---|
| 1.000 | ASPH. | 18.613 | 1.000 | 1.535 | 56.197 | 14.452 | 0.000 |
| 2.000 | ASPH. | 6.021 | 2.961 | | | 11.046 | −2.213 |
| 3.000 | STD. | Infinity | 0.750 | 1.618 | 63.417 | 10.899 | 0.000 |
| 4.000 | STD. | 8.038 | 1.504 | | | 9.814 | 0.000 |

TABLE 3A-continued shows the optical prescription of Example 3.

| Surf | Type | Radius | Thickness | Nd | Abbe# | Diameter | Conic |
|---|---|---|---|---|---|---|---|
| 5.000 | STD. | 18.620 | 2.447 | 1.804 | 46.568 | 9.910 | 0.000 |
| 6.000 | STD. | −18.620 | 4.534 | | | 9.752 | 0.000 |
| 7.000 | ASPH. | 10.844 | 1.850 | 1.535 | 56.197 | 6.272 | 0.000 |
| 8.000 | ASPH. | −9.983 | 0.100 | | | 5.758 | 0.000 |
| STO | STD. | 13.318 | 2.391 | 1.618 | 63.417 | 4.744 | 0.000 |
| 10.000 | STD. | −4.753 | 0.500 | 1.620 | 36.348 | 4.998 | 0.000 |
| 11.000 | STD. | 5.570 | 5.273 | | | 5.324 | 0.000 |
| 12.000 | STD. | Infinity | 2.506 | 1.618 | 63.417 | 11.755 | 0.000 |
| 13.000 | STD. | −12.945 | 0.100 | | | 12.444 | 0.000 |
| 14.000 | ASPH. | 17.045 | 2.270 | 1.535 | 56.197 | 12.731 | 0.000 |
| 15.000 | ASPH. | 12.359 | 3.512 | | | 14.396 | 0.000 |
| IMA | STD. | Infinity | | | | 15.973 | 0.000 |

TABLE 3B

The aspheric coefficients for the aspheric surfaces of Example 3 as per Equation (1).

Surface 1:

| | |
|---|---|
| Coeff on r 2: | 0 |
| Coeff on r 4: | −0.00027450861 |
| Coeff on r 6: | 9.450237e−007 |
| Coeff on r 8: | −2.3065243e−009 |

Surface 2:

| | |
|---|---|
| Coeff on r 2: | 0 |
| Coeff on r 4: | 0.00092691055 |
| Coeff on r 6: | −6.6716515e−006 |

Surface 7:

| | |
|---|---|
| Coeff on r 2: | 0 |
| Coeff on r 4: | −0.00016215002 |

Surface 8:

| | |
|---|---|
| Coeff on r 2: | 0 |
| Coeff on r 4: | 0.0002461795 |
| Coeff on r 6: | −9.7401919e−007 |

Surface 14:

| | |
|---|---|
| Coeff on r 2: | 0 |
| Coeff on r 4: | −0.0014283981 |
| Coeff on r 6: | −1.0802005e−006 |
| Coeff on r 8: | 2.5279061e−009 |

Surface 15:

| | |
|---|---|
| Coeff on r 2: | 0 |
| Coeff on r 4: | −0.0016443133 |
| Coeff on r 6: | −9.6586534e−006 |
| Coeff on r 8: | 4.3176918e−007 |
| Coeff on r 10: | −4.1215076e−009 |

Example 4

Figure 5:
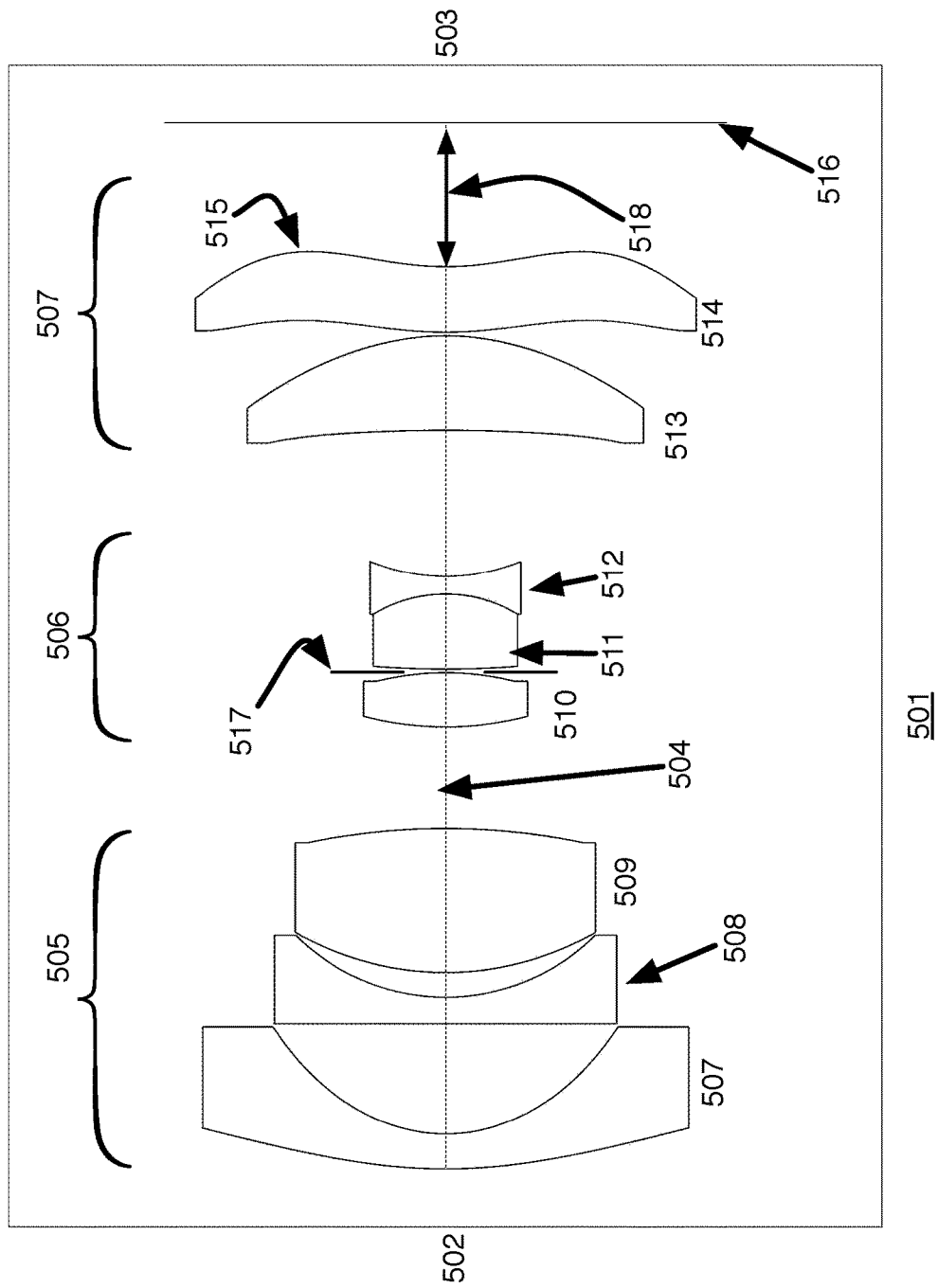
FIG. 5 is a diagram of a fourth embodiment of the compact wide angle lens.

FIG. 5 shows the layout of Example 4. This design has a field angle of +/−47° (for a total field of view 94°) with a relative aperture of F/3.3. The lens 501, in going from object 502 to image 503, is comprised of three (3) lens groups 505, 506, 507. The first lens group 505 has negative power and is comprised of at least 2 lens elements and in this example is comprised of three lens elements 507, 508, 509. At least one of the elements 509 is a positive lens element. An aspheric element 507 is included in this first group 505.

The second lens group 506 has positive power comprising at least 3 lens elements 510, 511, 512 including a cemented doublet formed by two of the 3 elements 511, 512, and an aperture stop 517. The first 510 and the second 511 elements have positive power. The third element 512 has negative power having a double concave shape. The 2nd and 3rd elements 511, 512 form a cemented doublet. An aperture stop 517 is located between the first 510 and second 511 element of the second lens group 506.

The third lens group 507 comprises at least 2 elements 513, 514. At least one of them is an aspherical element. In this 4$^{th}$ example both elements 513, 514 are aspherical. An aspheric element 514 is the last element that faces the image plane 516. At least one surface 515 of the aspheric element 514 has a complex surface profile. A complex aspheric surface 515 is the last optically powered surface facing the image plane 516 (not including any flat filter or sensor cover glass). In this example 4, both surfaces of the lens element 515 are complex aspheric surfaces. The distance 518 from the image side surface 515 vertex of the last lens element 514 to the image plane 516 is back focal length (BFL). The overall effective focal length of the lens assembly is EFL. The clear aperture diameter of this complex aspheric surface is CA. The lens elements are selected and placed to satisfy the equations 2 and 3 shown above. Table 4A shows the optical specification for this third example. The surfaces are numbered as already described. The radiuses of curvature are measured at the optical axis 504. Table 4B shows the optical specifications for the aspheric lens by providing the constants for Equation 1. The EFL of this example is 8.08 mm. BFL is 4.1 mm and the CA of 14.2 mm. The conditional expression (2) and (3) are satisfied.

TABLE 4A shows the optical prescription of Example 4.

| Surf | Type | Radius | Thickness | Nd | Abbe# | Diameter | Conic |
|---|---|---|---|---|---|---|---|
| 1.000 | ASPH. | 15.172 | 1.000 | 1.535 | 56.197 | 13.750 | 0.000 |
| 2.000 | ASPH. | 4.686 | 3.122 | | | 9.753 | −0.740 |
| 3.000 | STD. | Infinity | 0.750 | 1.593 | 68.695 | 9.682 | 0.000 |
| 4.000 | STD. | 5.965 | 0.705 | | | 8.464 | 0.000 |
| 5.000 | STD. | 8.502 | 4.089 | 1.743 | 49.238 | 8.496 | 0.000 |
| 6.000 | STD. | −19.231 | 2.879 | | | 7.800 | 0.000 |

TABLE 4A-continued shows the optical prescription of Example 4.

| Surf | Type | Radius | Thickness | Nd | Abbe# | Diameter | Conic |
|------|------|--------|-----------|-------|--------|----------|-------|
| 7.000 | ASPH. | 8.860 | 1.533 | 1.535 | 56.197 | 4.651 | 0.000 |
| STO | ASPH. | −7.885 | 0.100 | | | 3.911 | 0.000 |
| 9.000 | STD. | 26.190 | 2.133 | 1.593 | 68.695 | 3.993 | 0.000 |
| 10.000 | STD. | −3.907 | 0.500 | 1.620 | 36.348 | 4.091 | 0.000 |
| 11.000 | STD. | 5.569 | 4.148 | | | 4.276 | 0.000 |
| 12.000 | ASPH. | −44.744 | 2.670 | 1.535 | 56.197 | 10.014 | 0.000 |
| 13.000 | ASPH. | −7.366 | 0.100 | | | 11.206 | 0.000 |
| 14.000 | ASPH. | 10.912 | 1.878 | 1.535 | 56.197 | 13.525 | 0.000 |
| 15.000 | ASPH. | 8.131 | 4.067 | | | 14.172 | 0.000 |
| IMA | STD. | Infinity | | | | 15.906 | 0.000 |

TABLE 4B

The aspheric coefficients for the aspheric surfaces of Example 4 as per Equation (1).

Surface 1:

Coeff on r 2:   0
Coeff on r 4:   −0.00026172611
Coeff on r 6:   1.1389733e−006
Coeff on r 8:   −3.9695577e−009

Surface 2:

Coeff on r 2:   0
Coeff on r 4:   0.00031331388
Coeff on r 6:   8.2769362e−006

Surface 7:

Coeff on r 2:   0
Coeff on r 4:   −0.0003692349

Surface 8:

Coeff on r 2:   0
Coeff on r 4:   0.00051644976
Coeff on r 6:   −9.716992e−006

Surface 12:

Coeff on r 2:   0
Coeff on r 4:   5.9835381e−005
Coeff on r 6:   −7.8711067e−006

Surface 13:

Coeff on r 2:   0
Coeff on r 4:   0.00046012715
Coeff on r 6:   2.4085634e−006

Surface 14:

Coeff on r 2:   0
Coeff on r 4:   −0.0019509106
Coeff on r 6:   1.8492481e−005

Surface 15:

Coeff on r 2:   0
Coeff on r 4:   −0.0027694282
Coeff on r 6:   2.016481e−005
Coeff on r 8:   −9.565005e−008

SUMMARY

Compact wide angle lens designs are described. The lens has three lens groups and includes complex aspherical lens elements. The lens designs have a field of view of 80° or greater.

I claim:

1. An optical lens for imaging, said lens having an effective focal length (EFL), a field of view, and optical axis and an image plane, and, said optical lens comprising:
   a. three lens groups located along the optical in order from object to image group one, group two and group three, wherein the first element of group one has negative power, and the group two has positive power and comprises a cemented doublet lens,
   b. the group three has positive power and includes a complex aspheric lens element as the last element in the group, the last element being nearest the image plane, the complex aspheric lens element having an image side surface, a vertex, and a clear aperture on the image surface nearest the image side surface, and,
   c. the image side surface of the complex aspheric lens has a surface profile, and, a local surface derivative of the surface profile changes sign at least once from center to the edge of the lens element, and,
   d. satisfying the conditions:

$BFL/CA <= 0.3$ where BFL is the distance from the image surface vertex of the complex aspheric lens element to the image plane, and, where CA is the clear aperture of the complex aspheric lens element.

2. The optical lens of claim 1 satisfying the conditions:

$BFL/EFL <= 0.6$ where BFL is the distance from the image surface vertex of the complex aspheric lens element to the image plane, EFL is the effective focal length of the optical lens.

3. The optical lens of claim 1 satisfying the conditions:

$3 =< TTL/EFL <= 6.6$ where TTL is the distance from the vertex of the first element of group one to the image plane of the lens assembly when focused at infinity, EFL is the effective focal length of the optical lens.

4. The optical lens of claim 1 satisfying at least one of the conditions:

$BFL/EFL <= 0.6$    a)

where BFL is the distance from the image surface vertex of the complex aspheric lens element to the image plane, EFL is the effective focal length of the optical lens, and, $BFL/CA <= 0.3$    b)

where CA is the clear aperture of the complex aspheric lens element, EFL is the effective focal length of the optical lens, and, $3 =< TTL/EFL <= 6.6$    c)

where TTL is the distance from the vertex of the first element of group one to the image plane of the lens assembly when focused at infinity, EFL is the effective focal length of the optical lens.

5. The optical lens of claim 1 satisfying all of the conditions:

$$BFL/EFL <= 0.6 \quad \quad d)$$

where BFL is the distance from the image surface vertex of the complex aspheric lens element to the image plane, EFL is the effective focal length of the optical lens, and, $$BFL/CA <= 0.3 \quad \quad e)$$

where CA is the clear aperture of the complex aspheric lens element, EFL is the effective focal length of the optical lens, and, $$3 =< TTL/EFL <= 6.6 \quad \quad f)$$

where TTL is the distance from the vertex of the first element of group one to the image plane of the lens assembly when focused at infinity, EFL is the effective focal length of the optical lens.

\* \* \* \* \*